(12) United States Patent
Register et al.

(10) Patent No.: US 8,524,825 B2
(45) Date of Patent: Sep. 3, 2013

(54) PEEL-COAT COMPOSITIONS

(75) Inventors: James A. Register, Garland, TX (US); Ted R. Best, Bowling Green, KY (US)

(73) Assignee: Valspar Sourcing, Inc., Minneapolis, MN (US)

( * ) Notice: Subject to any disclaimer, the term of this patent is extended or adjusted under 35 U.S.C. 154(b) by 622 days.

(21) Appl. No.: 12/526,183

(22) PCT Filed: Jan. 15, 2008

(86) PCT No.: PCT/US2008/000494
§ 371 (c)(1),
(2), (4) Date: Oct. 21, 2010

(87) PCT Pub. No.: WO2008/097415
PCT Pub. Date: Aug. 14, 2008

(65) Prior Publication Data
US 2011/0034618 A1    Feb. 10, 2011

Related U.S. Application Data

(60) Provisional application No. 60/900,240, filed on Feb. 8, 2007.

(51) Int. Cl.
*C08L 61/00* (2006.01)
(52) U.S. Cl.
USPC .................. 524/512; 524/593; 427/385.5
(58) Field of Classification Search
USPC ................ 524/512, 593; 427/385.5
See application file for complete search history.

(56) References Cited

U.S. PATENT DOCUMENTS

| 4,009,136 | A | * | 2/1977 | Lewandowski et al. ...... 523/171 |
| 6,464,823 | B1 | | 10/2002 | Vantyle |
| 6,713,522 | B2 | | 3/2004 | Zhang et al. |
| 6,762,230 | B2 | | 7/2004 | Brandenburger et al. |
| 6,822,012 | B1 | | 11/2004 | Baumgart et al. |
| 6,964,989 | B1 | * | 11/2005 | Fang et al. ................... 524/145 |
| 6,991,851 | B2 | | 1/2006 | Krepski et al. |
| 2003/0072948 | A1 | | 4/2003 | Krepski et al. |
| 2003/0214715 | A1 | | 11/2003 | Bermel |
| 2004/0009354 | A1 | | 1/2004 | Krepski et al. |

FOREIGN PATENT DOCUMENTS

| DE | 4201941 A1 | 8/1993 |
| JP | 48071426 A | 9/1973 |
| JP | 9075877 A | 3/1997 |
| WO | 0170834 A1 | 9/2001 |
| WO | 0171393 A1 | 9/2001 |

OTHER PUBLICATIONS

"Butvar Polyvinyl Butyral Resin BR Resin Technical Bulletin". Solutia Technical Bulletin, Pub. No. 2006019F.
"Butvar Polyvinyl Butyral Resin Dispersion FP Resin Technical Bulletin". Solutia Technical Bulletin, Pub. No. 2009340B.
International Search Report & Written Opinion of Counterpart Application No. PCT/US2008/000494 filed Jan. 15, 2001.

* cited by examiner

*Primary Examiner* — Robert D. Harlan

(57) ABSTRACT

A composition for forming a peelable coating, the composition comprising an aqueous carrier, a water-dispersible polyvinyl butyral, and an acrylic latex compound.

18 Claims, 1 Drawing Sheet

PEEL-COAT COMPOSITIONS

CROSS-REFERENCE TO RELATED APPLICATION(S)

This Application is a 371 National Stage Application of International Application No. PCT/US2008/000494, filed on Jan. 15, 2008, published as International Publication No. WO 2008/097415, and which claims priority to U.S. Provisional Application No. 60/900,240, filed on Feb. 8, 2007, the disclosures of which are incorporated by reference in their entireties.

BACKGROUND

The present invention relates to compositions for forming protective coatings. In particular, the present invention relates to compositions for forming peelable coatings that protect underlying substrate surfaces.

A variety of manufactured products (e.g., vehicles and appliances) include metal surfaces that are painted for aesthetic qualities. However, during storage and transportation, the manufactured products are often subjected to one or more potentially damaging conditions, such as chemical and abrasive conditions. Without protection, the painted surfaces of the manufactured products may be chipped, scratched, or otherwise damaged during storage and transportation. Furthermore, for manufactured products that are subjected to atmospheric conditions during storage and transportation (e.g., automobiles), the elements of nature, such as rain and dust, may also render the manufactured products dirty, thereby requiring subsequent cleaning steps.

One technique for protecting painted surfaces from damage involves applying coatings to the surfaces, where the coatings include polyvinyl chloride (PVC). However, vinyl chloride emissions that are produced during the synthesis and degradation of PVC are believed to be potential environmental concerns. Thus, due to such concerns, an increasing number of consumers are requesting products that are free of PVC-based compositions. Accordingly, there is a need for PVC-free coatings that protect underlying painted surfaces from damaging conditions during storage and transportation, and are readily removable.

SUMMARY

The present invention relates to a peel-coat composition and a peel coat formed from the composition. The composition includes an aqueous carrier, a polyvinyl butyral, and an acrylic latex compound.

DETAILED DESCRIPTION

Figure 1:
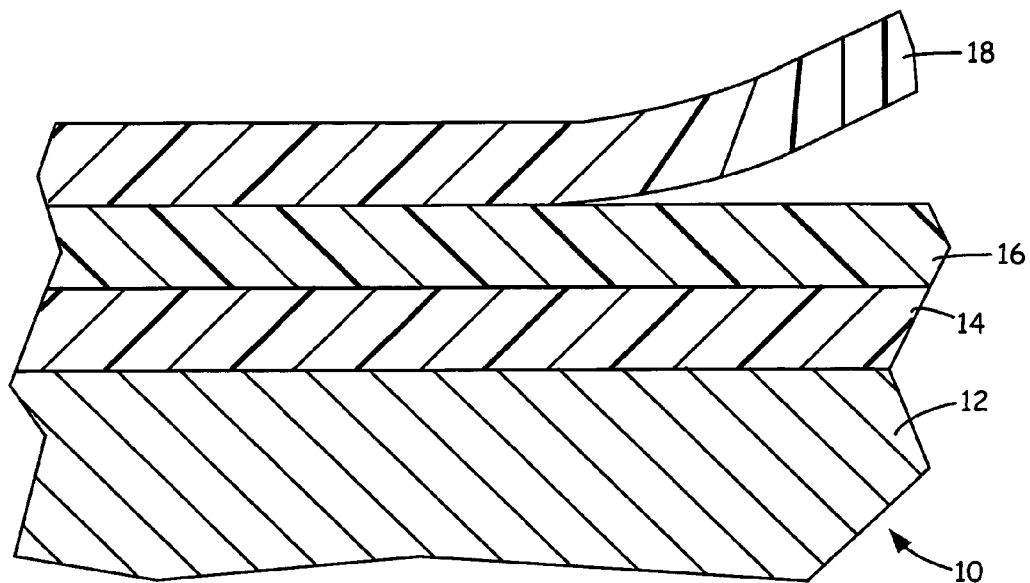
FIG. 1 is a sectional view of a coated article, where the coated article includes a coating formed from a peel-coat composition of the present invention.

FIG. 1 is a sectional view of one embodiment of coated article 10, which preferably includes substrate 12, primer coating 14, topcoat 16, and peel coat 18, where peel coat 18 is a removable coating formed from a peel-coat composition of the present invention. In this embodiment, substrate 12 is a structure (e.g., a metal structure) that is coated with a coating that decorates or protects (or both decorates and protects) the substrate. In the embodiment shown, the coating comprises a two-composition system comprising primer coating 14 and topcoat 16. Primer coating 14 and topcoat 16 are preferably surface-treatment coatings that provide protective and/or other aesthetic qualities (e.g., color) to coated article 10. As discussed below, peel coat 18 is suitable for use with a variety of coatings. As such, primer coating 14 and topcoat 16 may be formed from a variety of different compositions (e.g., fluoropolymers and urethanes). In an alternative embodiment, primer coating 14 and topcoat 16 may comprise a single layer (e.g., a paint that functions as both a primer and a topcoat), or additional compositions or additional layers of the compositions may be used.

In one embodiment, the peel-coat composition used to form peel coat 18 preferably includes an aqueous carrier, polyvinyl butyral, and an acrylic latex compound. This combination provides a coating that preferably has an adhesive strength that prevents the coating from delaminating from the adhered-to surface (e.g., topcoat 16) during normal transportation and storage, while also preferably allowing the coating to be removed without excessive removal strengths. For example, the adhesive strength desirably allows the coating to be removed without damaging the coating (e.g., the required removal strength is less than the tensile strength of the coating). Additionally, in preferred embodiments the peel-coat composition is substantially free of PVC-containing compounds (i.e., less than about 100 parts-per-million by weight). As a result, the peel coat composition does not exhibit the above-discussed environmental concerns that are prevalent with PVC emissions.

The peel-coat composition may be prepared by mixing (e.g., at high speeds) the aqueous carrier, the polyvinyl butyral, the acrylic latex compound, and any additional optional additives, until the polyvinyl butyral is at least substantially dispersed, solubilized, emulsified, or otherwise suspended in the aqueous carrier and the acrylic latex compound is at least substantially dispersed, solubilized, emulsified, or otherwise suspended in the aqueous carrier. The peel-coat composition desirably has a percentage of non-volatile materials by weight (% NVM) that provides suitable dry film thicknesses for peel coat 18. Examples of suitable % NVMs for the peel-coat composition prior to coating include at least about 40% by weight, based on the entire weight of the peel-coat composition, and as measured pursuant to ASTM D2369-98.

Figure 2:
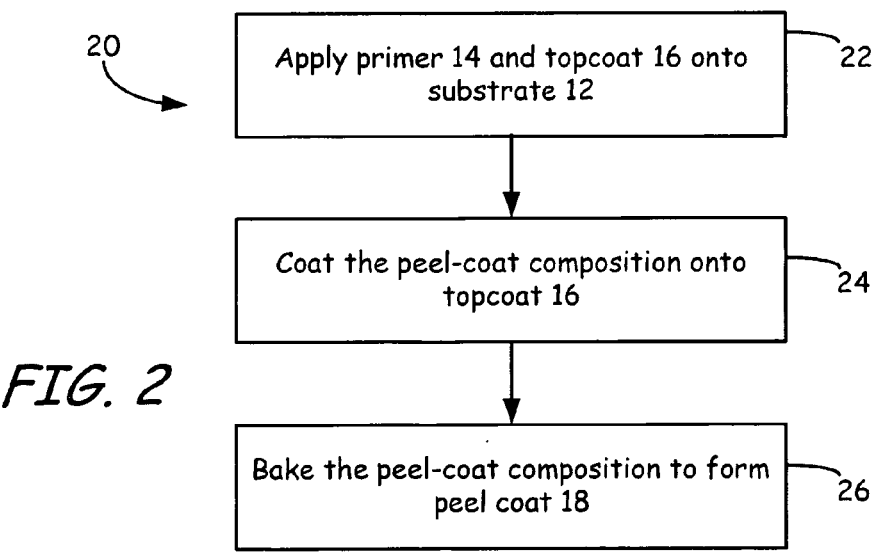
FIG. 2 is a flow diagram of a method for forming a coated article containing the coating formed from the peel-coat composition.

FIG. 2 is a flow diagram of method 20, which is a suitable method for forming coated article 10 (shown in FIG. 1) with the peel-coat composition. Method 20 preferably includes steps 22, 24 and 26, and initially involves applying a coating (e.g., primer coating 14 and topcoat 16) onto substrate 12 (step 22). This may be performed in a variety of manners using standard coating techniques. For example, primer coating 14 may be applied by coating a primer composition onto substrate 12 and then baking or otherwise curing the composition to form primer coating 14. Topcoat 16 may be applied on primer coating 14 in the same manner. Alternatively, primer coating 14 and topcoat 16 may comprise a single layer of a coating composition.

The peel-coat composition is then preferably coated onto topcoat 16 (step 24). This may be performed using a variety of coating techniques, such as sheet coating, coil coating, roll coating, spray coating, and the like. The peel-coat composition is then preferably baked to at least substantially remove the aqueous carrier and to cure the remaining composition, thereby forming peel coat 18 on topcoat 16 (step 26). In one embodiment, the baking may be performed by passing the coated substrate 12 through an oven maintained at a temperature suitable for volatilizing the aqueous carrier. Suitable baking temperatures of the oven may vary depending on multiple factors, such as the speed of the coating process, the coating thickness, and heat transfer conditions. Examples of suitable baking conditions include baking temperatures ranging from about 150° C. to about 400° C. with baking durations ranging from about 30 seconds to about 2 minutes.

Once formed, peel coat 18 is preferably adhered to topcoat 16 with an adhesive strength that prevents premature peeling during transportation and storage while also allowing peel coat 18 to be peeled from topcoat 16 without an undue removal strength. Removal strengths required to remove peel coat 18 from topcoat 16 may vary depending on the composition of topcoat 16. However, peel coat 18 preferably exhibits balanced peel strengths for a variety of topcoat compositions, such as fluoropolymer and urethane topcoats. Examples of suitable adhesive strengths between peel coat 18 and topcoats (e.g., topcoat 16) range from about 5.3 kilograms/centimeter$^2$ (kg/cm$^2$) (about 75 pounds/inch (lbs/in$^2$)) to about 21 kg/cm$^2$ (about 300 lbs/in$^2$), with particularly suitable adhesive strengths ranging from about 7.0 kg/cm$^2$ (about 100 lbs/in$^2$) to about 14 kg/cm$^2$ (about 200 lbs/in$^2$), where the adhesive strengths are measured pursuant to ASTM D903-98.

Peel coat 18 desirably has a dry film thickness that allows peel coat 18 to protect topcoat 16 from typical chemical and abrasive conditions (e.g., scratches and chips incurred during transportation). Examples of suitable dry film thicknesses for peel coat 18 range from about 2.5 micrometers (about 0.1 mil) to about 50 micrometers (about 2 mil), with particularly suitable dry film thicknesses ranging from about 13 micrometers (about 0.5 mil) to about 25 micrometers (about 1 mil).

As discussed above, the peel-coat composition used to form peel coat 18 preferably includes an aqueous carrier, polyvinyl butyral, and an acrylic latex compound. The aqueous carrier of the composition preferably includes water, and may also include organic solvents to preferably increase evaporation rates and/or to function as coalescent/film-forming aids.

Examples of organic solvents for use in the aqueous carrier include methanol, ethanol, isopropyl alcohols, butyl alcohols (e.g., n-butanol), 2-butoxyethanol, 2-(2-butoxyethoxy)ethanol (i.e., butyl carbitol), aromatic solvents, isophorones, glycol ethers, glycol ether acetates, acetone, methyl-ethyl ketones (MEK), N,N-dimethylformamides, ethylene carbonates, propylene carbonates, diglymes, N-methylpyrrolidones (NMP), ethyl acetates, ethylene diacetates, propylene glycol diacetates, alkyl ethers of ethylene, propylene glycol monoacetates, toluene, xylenes, and combinations thereof.

Examples of particularly suitable organic solvents for use in the aqueous carrier include coalescent/film-forming aids, such as 2-(2-butoxyethoxy)ethanol. Suitable concentrations of organic solvents in the aqueous carrier range from about 0.1% by weight to about 30% by weight, based on the total weight of the aqueous carrier. The term "about" is used herein with respect to component concentrations due to expected compositional variations known to those skilled in the art (e.g., limitations and variabilities in measurements).

The polyvinyl butyral component preferably functions to increase the toughness and weathering resistance of peel coat 18. The polyvinyl butyral desirably has good optical clarity and flexibility to provide suitable aesthetic and physical properties. In one embodiment, the polyvinyl butyral may be a reaction product of butyraldehyde and polyvinyl alcohol, which desirably provides a polymer having acetal moieties (e.g., butyraldehyde acetyl groups). The polyvinyl butyral may also include one or more hydroxyl moieties (e.g., polyvinyl alcohol groups) and one or more ester moieties (e.g., polyvinyl acetate groups) in the polymer chain. Hydroxyl moieties and the ester moieties are typically found in commercially available polyvinyl butyral resins.

Suitable concentrations of the hydroxyl moieties in the polyvinyl butyral range include about 30% by weight or less, with particularly suitable concentrations to about 20% by weight or less. Suitable concentrations of the ester moieties in the polyvinyl butyral range include about 10% by weight or less, with particularly suitable concentrations to about 5% by weight or less. Examples of suitable weight average molecular weights ($M_w$) for the polyvinyl butyral range from about 5,000 to about 300,000, with particularly suitable weight average molecular weights ranging from about 50,000 to about 200,000.

The polyvinyl butyral is preferably dispersible, soluble, emulsifiable, or otherwise suspendable in water, thereby preferably allowing the polyvinyl butyral to form a mixture in the aqueous carrier. In one embodiment, the polyvinyl butyral may form a storage-stable mixture in the aqueous carrier, in which the mixture has at least one month shelf stability at 25° C.

In an additional embodiment, the polyvinyl butyral may also be provided as a dispersion in water, where the water of the polyvinyl butyral dispersion may constitute at least a portion of the aqueous carrier. Examples of suitable commercially available polyvinyl butyral dispersions include those under the series "BUTVAR®" resin dispersions from Solutia, Inc., St. Louis, Mo., which are plasticized polyvinyl butyrals dispersed in water. Suitable concentrations of the polyvinyl butyral in the peel-coat composition range from about 10% by weight to about 40% by weight, with particularly suitable concentrations ranging from about 15% by weight to about 25% by weight, based on the total solids weight of the peel-coat composition.

The acrylic latex compound is preferably an ethylenically-unsaturated compound that is preferably dispersible, soluble, emulsifiable, or otherwise suspendable in water, thereby allowing the acrylic latex compound to form a mixture in the aqueous carrier. The acrylic latex compound is more preferably emulsifiable in the aqueous carrier with the use of a dispersing agent (e.g., a surfactant). In one embodiment, the acrylic latex compound may form a storage-stable emulsion in the aqueous carrier, in which the emulsion has at least one month shelf stability at 25° C.

The ethylenically-unsaturated compound is preferably a compound (e.g., monomers, oligomers, polymers, and combinations thereof) having one or more (meth)acrylate functionalities. The term "(meth)acrylate", as used herein, refers to an acrylate and a methacrylate functionality. Examples of suitable compounds having one or more (meth)acrylate functionalities for use in the peel-coat composition include methyl (meth)acrylates, ethyl (meth)acrylates, propyl (meth)acrylates, butyl (meth)acrylates, 2-ethylhexyl (meth)acrylates, hydroxyethyl (meth)acrylates, hydroxybutyl (meth)acrylates, cyclohexyl (meth)acrylates, acrylic acids, methacrylic acids, and combinations thereof.

In one embodiment, the acrylic latex compound may also be provided as an emulsion in water, where the water of the acrylic emulsion may constitute at least a portion of the aqueous carrier. Examples of suitable commercially available acrylic emulsions include those under the series "UCAR®" latexes from Union Carbide Chemicals & Plastics Technology Corporation, Danbury, Conn. Suitable concentrations of the acrylic latex compound in the peel-coat composition range from about 5% by weight to about 40% by weight, with particularly suitable concentrations ranging from about 15% by weight to about 30% by weight, based on the total solids weight of the peel-coat composition. Furthermore, suitable solids weight ratios of the polyvinyl butyral to the acrylic latex compound range from about 20:80 (i.e., about 20 parts of polyvinyl butyral to about 80 parts of the acrylic latex compound, by weight) to about 80:20, with particularly suitable solids weight ratios ranging from about 40:60 to about 60:40.

Suitable dispersing agents for forming an emulsion in the aqueous carrier with the ethylenically-unsaturated compound include one or more nonionic or anionic surfactants. Suitable concentrations of the dispersing agents in the peel-coat composition range from about 0.1% by weight to about 10% by weight, with particularly suitable concentrations ranging from about 0.5% by weight to about 5% by weight, based on the total weight of the peel-coat composition.

Examples of suitable nonionic surfactants for use in the peel-coat composition include tertoctylphenoxy ethylpoly (39)ethoxyethanol, dodecyloxypoly-(10)ethoxyethanol, nonylphenoxyethylpoly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly (20)ethoxyethanol, hydroxyethyl-cellulose polybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene(20)-lauramide, N-lauryl-N-polyoxyethylene (3)amine,poly(10) ethylene glycol dodecyl thioether, and combinations thereof.

Examples of suitable anionic surfactants for use in the peel-coat composition include sodium lauryl sulfate, sodium dodecylbenzenesulfonate, potassium stearate, sodium dioctyl sulfosuccinate, sodium dodecyldiphenyloxide disulfonate, nonylphenoxyethylpoly-(I)ethoxyethyl sulfate ammonium salt, sodium styrene sulfonate, sodium dodecyl allyl sulfosuccinate, linseed oil fatty acid, sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxyethyl)-N-octadecylsulfo-succinamate, disodium N-octadecylsulfo-succinamate, disodium alkylamido polyethoxy sulfosuccinate, disodium ethoxylated nonylphenol half ester of sulfosuccinic acid, the sodium salt of tert-octylphenoxy ethoxy-poly(39)ethoxyethyl sulfate, and combinations thereof.

In addition to the aqueous carrier, the polyvinyl butyral, and the acrylic latex compound, the peel-coat composition may also include one or more additional components, such as plasticizers, polyols, defoaming agents, flow-control agents, heat stabilizers, leveling agents, thickening agents, pH-modifying agents, coalescents, dyes, pigments, colorants, ultraviolet-light absorbers, optical brighteners, biocides, and combinations thereof.

Plasticizers preferably modify the flow properties of the peel-coat composition and increase the flexibility of peel coat 18. Examples of suitable plasticizers include phthalates, phosphates, adipates, sebacates, epoxidized oils, polyesters, and combinations thereof. Suitable concentrations of plasticizers in the peel-coat composition range from about 0.1% by weight to about 25% by weight, with particularly suitable concentrations ranging from about 1% by weight to about 10% by weight, based on the total weight of the peel-coat composition.

Examples of suitable polyols for use in the peel-coat composition include alcohols having 1 to 6 hydroxy groups, such as ethylene glycol, 1,2-propanediol (i.e., propylene glycol), 1,3-propanediol, 1,2-butanediol, 1,3-butanediol, 1,4-butanediol, 2-ethyl-1,3-propanediol, 2-methylpropanediol, 2-butyl-2-ethylpropanediol, 2-ethyl-1,3-hexanediol, 1,3 neopentyl glycol, 2,2-dimethyl-1,3-pentanediol, 1,6 hexanediol, 1,2-cyclohexanediol, 1,4-cyclohexanediol, bisphenol A, 1,2-bis (hydroxymethyl)cyclohexane, 1,4-bis(hydroxymethyl)cyclohexane, bis(4-hydroxycyclohexyl)-methane, adipic acid bis-(ethylene glycol ester), ether alcohols (e.g., diethylene glycol and triethylene glycol), dipropylene glycol, perhydrogenated bisphenols, 1,2,4-butanetriol, 1,2,6-hexanetriol, trimethylolethane, trimethylolpropane, trimethylolhexane, glycerol, pentaerythritol, dipentaerythritol, mannitol, and sorbitol, and combinations thereof. Suitable concentrations of polyols in the peel-coat composition range from about 0.1% by weight to about 10% by weight, with particularly suitable concentrations ranging from about 3% by weight to about 7% by weight, based on the total weight of the peel-coat composition.

Examples of suitable defoaming agents include polysiloxane defoamers (e.g., methylalkylpolysiloxanes), polymeric defoamers, and combinations thereof. Suitable concentrations of the defoaming agents in the peel-coat composition range from about 0.1% by weight to about 1% by weight, with particularly suitable concentrations ranging from about 0.1% by weight to about 0.5% by weight, based on the total weight of the peel-coat composition.

PH-modifying agents are beneficial for maintaining desired pH levels for the peel-coat composition. In general, polyvinyl butyral forms a stable dispersion in water for pHs ranging from about 8 to about 10. However, the pHs of acrylic latex compounds are typically below a pH of 8. As a result, when the polyvinyl butyral resin and the acrylic latex compound are combined in the aqueous carrier, the acrylic latex compound may lower the pH of the peel-coat composition, thereby causing a portion of the polyvinyl butyral resin to precipitate out of the aqueous carrier. Thus, pH-modifying agents are beneficial for maintaining a composition pH of at least about 8. Examples of suitable pH-modifying agents include nitrogen-containing bases, such as amines (e.g., dimethylolamine). Suitable concentrations of the pH-modifying agents in the peel-coat composition range from about 0.1% by weight to about 2% by weight, with particularly suitable concentrations ranging from about 0.1% by weight to about 0.5% by weight, based on the total weight of the peel-coat composition.

The peel-coat composition used to form peel coat 18 may also contain an optional coalescent, and many coalescents are known in the art. In one embodiment, the optional coalescent may be a low-volatile organic compound (VOC) coalescent. Examples of suitable low-VOC coalescents are described in Brandenburger et al., U.S. Pat. No. 6,762,230.

While discussed above for use with topcoat-covered surfaces (e.g., topcoat 16), the peel-coat composition may alternatively be applied directly to a variety of substrates including wood, cement, cement fiber board, wood-plastic composites, tile, metal, plastic, glass, optical fibers, and fiberglass. As such, the peel-coat composition may be used to form peel coats to protect a variety of structures from weathering, chemical, and abrasive conditions.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

Examples 1-3

Coated Articles of Examples 1-3 each included a peel coat of the present invention disposed on a topcoat-coated substrate, where the topcoats varied between each coated article. The peel coats for the coated articles were initially prepared by preparing a peel-coat composition having the component concentrations listed in Table 1.

TABLE 1

| Component | Percent by Weight |
| --- | --- |
| PVB dispersion FP | 40.5 |
| Acrylic emulsion | 52.6 |
| Propylene glycol | 5.3 |
| Defoaming agent | 0.2 |
| Butyl carbitol | 1.1 |
| Surfactant | 0.1 |
| Dimethylolamine | 0.2 |

PVB dispersion FP: A polyvinyl butyral dispersion commercially available under the trademark "BUTVAR® PVB Resin Dispersion FP" from Solutia, Inc., St. Louis, Mo., which contained a plasticized polyvinyl butyral dispersed in water (about 50% by weight solids of the polyvinyl butyral resin).

Acrylic emulsion: An acrylic emulsion commercially available under the trademark "UCAR® 411 Latexes" from Union Carbide Chemicals & Plastics Technology Corporation, Danbury, Conn., which contained an acrylic latex compound emulsified in water (about 45% by weight solids of the acrylic latex compound).

Propylene glycol: Propylene glycol commercially available from Lyondell Chemical Company, Houston, Tex.

Defoaming agent: An anti-foam agent commercially available from Verichem, Inc., Pittsburgh, Pa.

Butyl carbitol: 2-(2-butoxyethoxy)ethanol film-forming aid commercially available from Eastman Chemical Company, Kingsport, Tenn.

Surfactant: A water-soluble, anionic phosphate fluorosurfactant commercially available under the trademark "ZONYL FSP" from E.I. du Pont de Nemours and Company.

Dimethylolamine: A pH-modifying agent commercially available from Huntsman International LLC, Salt Lake City, Utah.

The water portions of the polyvinyl butyral dispersion and the acrylic emulsion constituted the aqueous carrier for the peel-coat composition. The components were mixed with a Cowles-type blade at high speeds until substantially dispersed/emulsified in the aqueous carrier. After mixing, the peel-coat composition had a solids ratio of the polyvinyl butyral to the acrylic latex compound of about 45:55.

The peel-coat composition was then coated onto a topcoat-coated substrate with a #60 wire-wound rod. The topcoat used for the coated article of Example 1 was a polyvinylidine difluoride (PVDF) coating commercially available under the trademark "FLUROPON®" from Valspar Corporation, Minneapolis, Minn. The topcoat used for the coated article of Example 2 was a fluoroethylene-alkyl vinyl ether (FEVE) copolymer commercially available under the trademark "VALFLON®" from Valspar Corporation. The topcoat used for the coated article of Example 3 was a thick-film urethane (TFU) coating commercially available from Valspar Corporation.

Each coated article was then baked in a low-velocity electric oven at a temperature of 177° C. (350° F.) for 60 seconds to obtain a peak metal temperature (PMT) ranging from 149° C. (300° F.) to 160° C. (320° F.). The baking process removed the aqueous carrier, thereby forming a peel coat on the topcoat, where the peel coat had a total dry film thickness of 33-38 micrometers (1.3-1.5 mils) (measured pursuant to ASTM D5796-99).

Examples 4-6

Coated Articles of Examples 4-6 each included an alternative peel coat of the present invention disposed on a topcoat-coated substrate, where the topcoats varied between each coated article. The peel coats for the coated articles were initially prepared by preparing a peel-coat composition having the component concentrations listed in Table 2.

TABLE 2

| Component | Percent by Weight |
| --- | --- |
| PVB dispersion FP | 46.6 |
| Acrylate emulsion | 47.3 |
| Propylene glycol | 4.7 |
| Defoaming agent | 0.1 |
| Butyl carbitol | 1.0 |
| Surfactant | 0.1 |
| Dimethylolamine | 0.2 |

The water portions of the polyvinyl butyral dispersion and the acrylic emulsion constituted the aqueous carrier for the peel-coat composition. The components were mixed with a Cowles-type blade at high speeds until substantially dispersed/emulsified in the aqueous carrier. After mixing, the peel-coat composition had a solids ratio of the polyvinyl butyral to the acrylic latex compound of about 55:45. The peel-coat composition was then coated onto topcoat-coated substrates and baked pursuant to the procedures discussed above for the coated articles of Examples 1-3, respectively. This provided the coated articles of Examples 4-6.

Comparative Example A-C

Coated Articles of Comparative Examples A-C each included a PVC-based peel coat disposed on a topcoat-coated substrate. For each coated article, the PVC-based peel coat was initially prepared with a PVC-based composition commercially available from Valspar Corporation, Minneapolis, Minn., and having the component concentration listed in Table 3.

TABLE 3

| Component | Percent by Weight |
| --- | --- |
| Plasticizer | 28.8 |
| Polyvinyl chloride | 53.3 |
| Melamine | 2.0 |
| Isobutyl alcohol | 0.4 |
| Cyclohexanone | 1.1 |
| Mineral spirits | 14.4 |

The peel-coat composition was coated onto a topcoat-coated substrate with a #60 wire-wound rod, where the topcoats used for the coated articles of Examples A-C were the same as those discussed above for the coated articles of Examples 1-3, respectively. Each coated article was then baked in a low-velocity electric oven at a temperature of 330° C. (625° F.) for 20-40 seconds to obtain a PMT of 200° C. (390° F.). The baking process formed a PVC-based peel coat on the topcoat, where the peel coat had a total dry film thickness of 25-30 micrometers (1.0-1.2 mils) (measured pursuant to ASTM D5796-99).

Peel Strength Testing of Examples 1-6 and Comparative Examples A-C

The coated articles of Examples 1-6 and Comparative Examples A-C were each tested for peel strengths pursuant to ASTM D903-98, which involved scoring the peel coat of the coated article and measuring the strength required to peel the peel coat from the given topcoat. Table 4 provides the peel strength results for the coated articles of Examples 1-6 and Comparative Examples A-C.

TABLE 4

| Example | Peel Coat | Topcoat | Peel Strength (psi) |
|---|---|---|---|
| Example 1 | PVB/Acrylic (45:55 solids ratio) | PVDF | 150 |
| Example 2 | PVB/Acrylic (45:55 solids ratio) | FEVE | 45 |
| Example 3 | PVB/Acrylic (45:55 solids ratio) | TFU | 200 |
| Example 4 | PVB/Acrylic (55:45 solids ratio) | PVDF | 75 |
| Example 5 | PVB/Acrylic (55:45 solids ratio) | FEVE | 0 |
| Example 6 | PVB/Acrylic (55:45 solids ratio) | TFU | 150 |
| Comparative Example A | PVC-based | PVDF | 125 |
| Comparative Example B | PVC-based | FEVE | 0 |
| Comparative Example C | PVC-based | TFU | No peel |

The results shown in Table 4 show the adhesive properties of the peel coats of the present invention. With the exception of Example 5, the coated articles of the present invention exhibited suitable peel strengths over the various topcoats. The peel-coat composition used with the coated articles of Examples 1-3 exhibited particularly suitable peel strengths with all three topcoat compositions.

In comparison, the PVC-based peel coat composition used with the coated articles of Comparative Examples A-C exhibited no adhesion to FEVE and would not peel from the thick film urethane topcoat. Additionally, the use of PVC, as discussed above, poses potential environmental concerns with PVC emissions that are not present with the peel-coat compositions of the present invention.

Examples 7-18

Peel-coat compositions for Examples 7-18 were prepared pursuant to the procedure discussed above for the peel-coat composition used in the coated articles of Examples 1-3. However, the peel-coat compositions for Examples 7-18 each included propylene glycol at 7.0% by weight, the defoaming agent at 0.1% by weight, the surfactant at 0.1% by weight, and the dimethylolamine at 0.2% by weight. The balance of each peel-coat composition include the acrylic emulsion, the PVB dispersion FP, and a second polyvinyl butyral dispersion commercially available under the trademark "BUTVAR® PVB Resin Dispersion CO24PON", from Solutia, Inc., St. Louis, Mo. (referred to as "PVB Dispersion CO24PON.

Table 5 lists the solids weight ratios of the acrylic latex compound to the polyvinyl butyral, and the solids weight ratios of the PVB resin FB to the PVB resin CO24PON, for each peel-coat composition of Examples 7-18. Table 5 also lists the % NVM for each peel-coat composition of Examples 7-18 (measured pursuant to ASTM D2369-98).

TABLE 5

| Example | Solids Ratio of PVB to Acrylic Latex Compound | Solids Ratio of PVB Dispersion FP to PVB Dispersion CO24PON | % NVM |
|---|---|---|---|
| Example 7 | 50/50 | 50/50 | 42.9 |
| Example 8 | 60/40 | 50/50 | 44.2 |
| Example 9 | 70/30 | 50/50 | 45.5 |
| Example 10 | 80/20 | 50/50 | 46.9 |
| Example 11 | 50/50 | 40/60 | 42.9 |
| Example 12 | 60/40 | 40/60 | 44.1 |
| Example 13 | 70/30 | 40/60 | 45.4 |
| Example 14 | 80/20 | 40/60 | 46.8 |
| Example 15 | 50/50 | 60/40 | 43.0 |
| Example 16 | 60/40 | 60/40 | 44.3 |
| Example 17 | 70/30 | 60/40 | 45.6 |
| Example 18 | 80/20 | 60/40 | 47.0 |

The solids ratios listed in Table 5 illustrate suitable ratios of the polyvinyl butyral to the acrylic latex compound that may be used to form stable peel-coat compositions. The peel-coat compositions of Examples 7-18 are accordingly suitable for forming coated articles pursuant to the procedures discussed above for the coated articles of Examples 1-3

Although the present invention has been described with reference to preferred embodiments, workers skilled in the art will recognize that changes may be made in form and detail without departing from the spirit and scope of the invention.

All patents, patent applications and literature cited in the specification are hereby incorporated by reference in their entirety. In the case of any inconsistencies, the present disclosure, including any definitions therein will prevail.

The invention of claimed is:

1. A coated article, comprising:
   a substrate; and
   a peelable coating disposed on the substrate, the peelable coating comprising a dried reaction product of a composition comprising an aqueous carrier, a polyvinyl butyral, and an ethylenically unsaturated acrylic latex compound, wherein the weight ratio of the polyvinyl butyral to the acrylic latex compound ranges from 40/60 to 60/40, and wherein the peelable coating has an adhesive strength to the substrate that substantially prevents the peelable coating from delaminating from the substrate during normal storage and transportation of the coated article, and allows the peelable coating to be removed with a removal strength that is less than a tensile strength of the peelable coating.

2. The coated article of claim 1, wherein the adhesive strength ranges from about 5.3 to about 21 kg/cm$^2$, as measured pursuant to ASTM D903-98.

3. The coated article of claim 1, wherein the adhesive strength ranges from about 7.0 to about 14 kg/cm$^2$, as measured pursuant to ASTM D903-98.

4. The coated article of claim 1, wherein the polyvinyl butyral is present in an amount ranging from about 10% by weight to about 40% by weight, based on a total solids weight of the composition.

5. The coated article of claim 1, wherein the peelable coating is substantially free of polyvinyl chloride.

6. A composition comprising: an aqueous carrier; a polyvinyl butyral; and an ethylenically unsaturated acrylic latex compound; wherein the composition forms a peelable coating when dried on a substrate, wherein a solids weight ratio of the water-dispersible polyvinyl butyral to the acrylic latex compound ranges from about 40:60 to about 60:40.

7. The composition of claim 6, wherein the water-dispersible polyvinyl butyral is present in an amount ranging from about 10% by weight to about 40% by weight, based on a total solids weight of the composition.

8. The composition of claim 6, wherein the acrylic latex compound is present in an amount ranging from about 10% by weight to about 40% by weight, based on a total solids weight of the composition.

9. The composition of claim 6, further comprising at least one pH modifying agent configured to provide a composition pH of at least about 8.

10. The composition of claim 6, wherein the composition is substantially free of polyvinyl chloride.

11. The composition of claim 6, further comprising an additive selected from the group consisting of plasticizers, defoaming agents, coalescents, polyols, film-forming aids, surfactants, and combinations thereof.

12. A method of forming a peelable coating on a substrate, the method comprising the steps of: coating the composition of claim 6 onto a substrate; and heating the coated composition, thereby at least substantially removing the aqueous carrier.

13. The method of claim 12, wherein coating the composition onto the substrate comprises coil coating the composition onto the substrate.

14. A composition comprising:
   an aqueous carrier;
   a polyvinyl butyral capable of forming a storage-stable mixture in the aqueous carrier; and
   an ethylenically-unsaturated monomer resin capable of forming a storage-stable emulsion in the aqueous carrier; wherein the weight ratio of the polyvinyl butyral to the acrylic latex compound ranges from 40/60 to 60/40, and wherein the composition forms a peelable coating when dried on a substrate.

15. The composition of claim 14, wherein the composition has at least about 40% non-volatile materials by weight, as measured pursuant to ASTM D2369-98.

16. The composition of claim 14, wherein the composition is substantially free of polyvinyl chloride.

17. The composition of claim 14, further comprising at least one pH modifying agent configured to provide a composition pH of at least about 8.

18. The composition of claim 14, further comprising an additive selected from the group consisting of plasticizers, defoaming agents, coalescents, polyols, film-forming aids, surfactants, and combinations thereof.

* * * * *